United States Patent Office 3,842,135
Patented Oct. 15, 1974

3,842,135
CATALYTIC ISOMERIZATION OF ALPHA-PINENE

Curry Beach Davis and Joseph J. McBride, Jr., Panama City, Fla., assignors to Arizona Chemical Company, New York, N.Y.
No Drawing. Filed Feb. 26, 1973, Ser. No. 335,844
Int. Cl. C07c 13/00; C09f 3/02
U.S. Cl. 260—675.5          4 Claims

ABSTRACT OF THE DISCLOSURE

There is provided a process for the isomerization of a pinene-containing material by subjecting the latter material to heat in the presence of activated carbon until isomerization is at least partially complete, whereby a mixture rich in camphene is recovered in good yield.

---

The present invention relates to terpene isomerization. More particularly, it relates to the isomerization of pinene to camphene utilizing activated carbon.

As is known, camphene or camphene rich mixtures which find utility in camphor production can be directly prepared from a terpene capable of being isomerized by mineral catalysts to camphene. See, for instance, U.S. Pats. Nos. 2,571,997; 2,551,795; 2,450,119; 2,385,711; 2,382,397; and 2,318,391. However, none of these methods which employ a catalyst to isomerize a pinene directly to camphene is wholly satisfactory. The use of acid catalysts, for instance, results in a lowered yield of camphene as well as the production of undesirable polymeric compounds. Moreover, acid clay catalyzed isomerizations of α-pinene are frequently uncontrollable, leading to severe explosions. To overcome these difficulties by providing for a straightforward and economical process for obviating explosions, excessive polymer formation and low yields would fulfill a need long recognized in the art.

It is, therefore, a principal object of the invention to provide an economical process to effect relatively speedy and safe isomerizations of pinene containing feeds. It is a further object to provide an activated carbon as an isomerization catalyst for pinene containing feeds. A still further object is to provide an activated carbon to effect isomerization of a pinene feed material in an inert atmosphere of nitrogen or carbon dioxide. Other objects and advantages will be readily ascertained from a reading of the ensuing description.

Unexpectedly, activated carbon, a known adsorbent material, is found to function as an isomerization catalyst for pinene containing materials. Activated carbon increases the yield of camphene while decreasing polymer formation during the isomerization of a pinene containing feed.

According to the process of the invention, a pinene containing feed material is subjected to the action of an activated carbon at temperatures ranging from about 75° C. to about 175° C., or higher, for from about 10 minutes to fifteen hours. There is then obtained a mixture rich in camphene free of polymers and low in byproduct terpene formation.

In general, any terpene capable of being isomerized to camphene by contact with an activated carbon can be employed. These are, for instance, α-pinene, β-pinene, gum turpentine, wood turpentine and the like.

Advantageously, any activated carbon and particularly a carbon activated with carbonates, such as calcium carbonate can be employed to effect the desired isomerization or conversion from a pinene to a camphene rich mixture. One such activated carbon is available under the tradename "Darco."

The amount of activated carbon employed in the process of the invention can be widely varied. Usually, from about 0.5% to about 10%, based on the weight of the material to be treated, is employed with good conversions to camphene.

To further illustrate the invention, the following examples are presented and are to be taken as illustrative and not by way of limitation. All the parts are by weight, unless otherwise noted.

EXAMPLE 1

To a suitable reaction vessel equipped with gas inlet, stirrer, reflux condenser, thermometer and containing 100 parts of α-pinene are added 2 parts of a commercially available activated carbon, having the designation: Darco S–51. The mixture is agitated while passing a stream of nitrogen over the surface of the mixture. The contents are next heated for about two and one half hours at reflux temperatures, usually, ranging from 156° C. to 165° C. to effect isomerization.

The reaction mixture is cooled, filtered, and the catalyst is removed. The filtrate is analyzed by vapor phase chromatography and is found to have the following composition:

|   | Percent |
|---|---|
| α-Pinene | 42.7 |
| Camphene | 32.5 |
| α-Terpinene | 1.7 |
| Dipentene | 12.5 |
| γ-Terpinene | 1.0 |
| Terpinolene | 4.3 |

The yield of camphene based on the weight of reacted α-pinene is found to be 58.8%.

Similar results are noted when β-pinene is substituted for α-pinene in the above example.

EXAMPLE 2

The procedure of Example 1 is repeated in every detail except that (a) the activated carbon is oven dried at 200° C. for about twelve hours prior to use and (b) the mixture is heated at reflux (156° C. increasing to 165° C.) for one hour. The product is cooled, and the catalyst is removed. Analysis of the product by vapor phase chromatography showed the following composition:

|   | Percent |
|---|---|
| α-Pinene | 33.8 |
| Camphene | 38.4 |
| α-Terpinene | 3.0 |
| Dipentene | 14.3 |
| γ-Terpinene | 1.4 |
| Terpinolene | 5.8 |

The yield of camphene is found to be 59.8% based on the weight of reacted α-pinene.

When substituting gum turpentine for α-pinene in the above example, similar results are obtained.

We claim:
1. A process for the isomerization of a pinene-containing feed material which consists in heating said material in an inert atmosphere at temperatures between 75° C. and 175° C. in contact with catalyst consisting essentially of a carbonate-activated carbon whereby camphene is recovered in good yield.
2. The process according to claim 1 wherein the pinene-containing material is α-pinene.
3. The process according to claim 1 wherein the pinene-containing material is β-pinene.
4. The process according to claim 1 wherein the activated carbon is present in an amount ranging from about 0.5% to about 10%, based on the weight of the feed material.

References Cited
UNITED STATES PATENTS

| | | | |
|---|---|---|---|
| 2,318,391 | 4/1943 | Henke et al. | 260—675.5 |
| 2,393,894 | 1/1946 | Farinacci et al. | 260—675.5 |
| 2,450,119 | 9/1948 | Carson | 260—675.5 |
| 2,551,795 | 5/1951 | Etzel | 260—675.5 |
| 3,278,623 | 10/1966 | Derfer | 260—675.5 |

DELBERT E. GANTZ, Primary Examiner

G. E. SCHMITKONS, Assistant Examiner

U.S. Cl. X.R.

260—666 A, 683.65